US010955846B1

(12) United States Patent
Silver et al.

(10) Patent No.: US 10,955,846 B1
(45) Date of Patent: *Mar. 23, 2021

(54) STOP SIGN DETECTION AND RESPONSE

(71) Applicant: WAYMO LLC, Mountain View, CA (US)

(72) Inventors: David Harrison Silver, San Carlos, CA (US); David Ian Franklin Ferguson, San Francisco, CA (US); Abhijit S. Ogale, Sunnyvale, CA (US); Wan-Yen Lo, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/522,921

(22) Filed: Jul. 26, 2019

Related U.S. Application Data

(63) Continuation of application No. 15/915,383, filed on Mar. 8, 2018, now Pat. No. 10,401,859, which is a continuation of application No. 15/622,666, filed on Jun. 14, 2017, now Pat. No. 9,939,815, which is a continuation of application No. 15/258,396, filed on Sep. 7, 2016, now Pat. No. 9,709,985, which is a continuation of application No. 14/845,616, filed on Sep. 4, 2015, now Pat. No. 9,463,794.

(51) Int. Cl.
*G05D 1/00* (2006.01)
*G05D 1/02* (2020.01)

(52) U.S. Cl.
CPC ......... *G05D 1/0088* (2013.01); *G05D 1/0231* (2013.01)

(58) Field of Classification Search
CPC ... G05D 1/0088; G05D 1/0231; B60W 30/00; B60W 2550/22; G01C 21/26
See application file for complete search history.

(56) References Cited

U.S. PATENT DOCUMENTS

| 8,195,394 B1 | 6/2012 | Zhu |
| 8,346,706 B2 | 1/2013 | Groitzsch et al. |
| 9,056,395 B1 | 6/2015 | Ferguson et al. |
| 9,459,623 B1 | 10/2016 | Raghu |
| 2008/0162027 A1 | 7/2008 | Murphy et al. |
| 2009/0074249 A1 | 3/2009 | Moed et al. |
| 2010/0241605 A1 | 9/2010 | Groitzsch |
| 2013/0253754 A1 | 9/2013 | Ferguson |

OTHER PUBLICATIONS

Volvo Car Group, Global Newsroom, <https:/lwww.media.volvocars.com/global/en-gb/media/pressreleases/158276/volvo-cars-presents-a-unique-system-solution-for-integrating-self-driving-cars-into-real-traffic> Feb. 19, 2015.

*Primary Examiner* — Anne Marie Antonucci
(74) *Attorney, Agent, or Firm* — Botos Churchill IP Law

(57) ABSTRACT

Aspects of the disclosure relate to detecting and responding to stop signs. An object detected in a vehicle's environment having location coordinates may be identified as a stop sign and, it may be determined whether the location coordinates of the identified stop sign correspond to a location of a stop sign in detailed map information. Then, whether the identified stop sign applies to the vehicle may be determined based on the detailed map information or on a number of factors. Then, if the identified stop sign is determined to apply to the vehicle, responses of the vehicle to the stop sign may be determined, and, the vehicle may be controlled based on the determined responses.

20 Claims, 10 Drawing Sheets

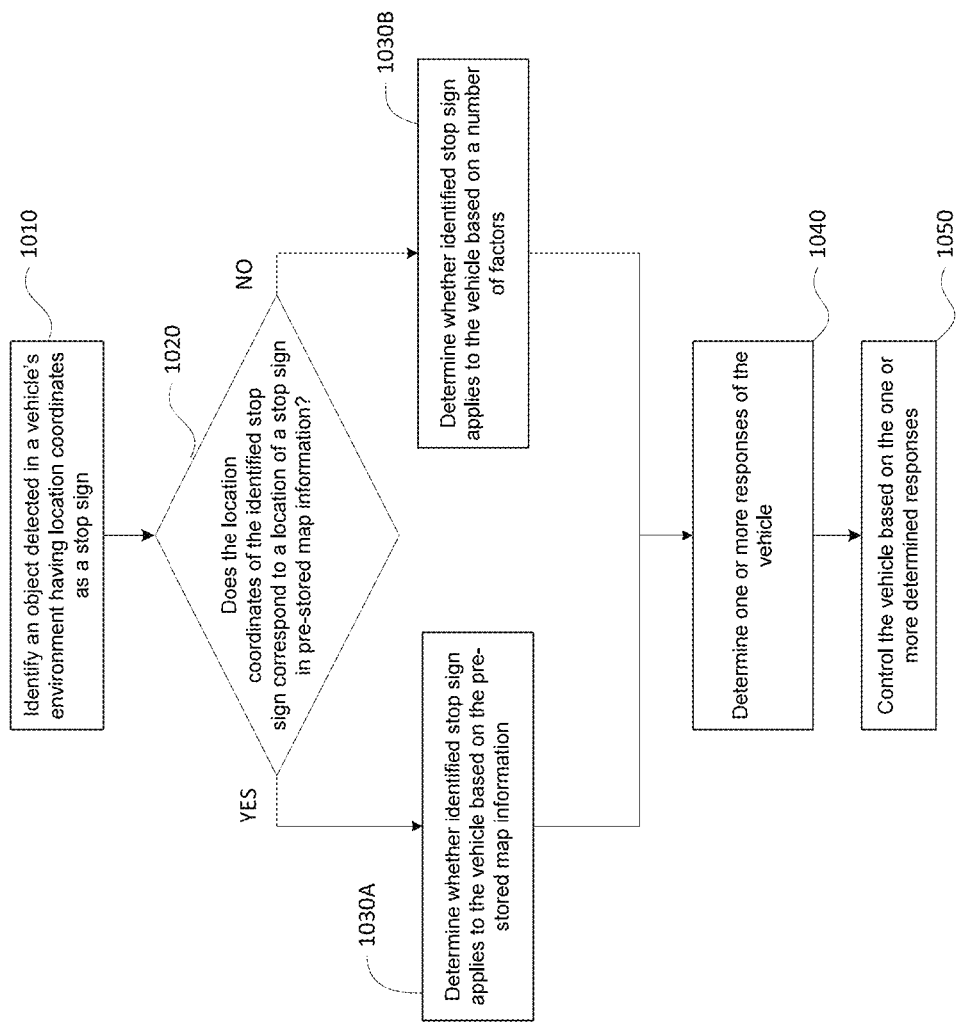

STOP SIGN DETECTION AND RESPONSE

CROSS-REFERENCE TO RELATED APPLICATIONS

The present application is a continuation of U.S. patent application Ser. No. 15/915,383, filed Mar. 8, 2018, which is a continuation of U.S. patent application Ser. No. 15/622,666, filed Jun. 14, 2017 which issued as U.S. Pat. No. 9,939,815 on Apr. 10, 2018, which is a continuation of U.S. patent application Ser. No. 15/258,396, filed Sep. 7, 2016 which issued as U.S. Pat. No. 9,709,985 on Jul. 18, 2017, which is a continuation of U.S. patent application Ser. No. 14/845,616, filed Sep. 4, 2015 which issued as U.S. Pat. No. 9,463,794 on Oct. 11, 2016, the disclosure of which is incorporated herein by reference.

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., parked cars, trees, buildings, etc.

Information from the perception system may be combined with highly detailed map information in order to allow a vehicle's computer to safely maneuver the vehicle in various environments. This highly detailed map information may describe expected conditions of the vehicle's environment such as the shape and location of roads, traffic signals, and other objects. In this regard, the information from the perception system and detailed map information may be used to assist a vehicle's computer in making driving decisions involving intersections and traffic signals.

BRIEF SUMMARY

Aspects of the disclosure provide for a method. The method includes identifying, by one or more computing devices, an object detected in a vehicle's environment having location coordinates as a stop sign; determining, by the one or more computing devices, whether the location coordinates of the identified stop sign correspond to a location of a stop sign in detailed map information; if the location coordinates do not correspond to a location of a stop sign in the detailed map information, determining, by the one or more computing devices, whether the identified stop sign applies to the vehicle based on at least a location of the identified stop sign in relation to a traffic lane; if the identified stop sign applies to the vehicle, determining, by the one or more computing devices, one or more responses of the vehicle based on at least one of the detailed map information, a determination of whether the identified stop sign is fixed, and a location of the identified stop sign in relation to one or more traffic control features; and controlling, by the one or more computing devices, the vehicle based on the one or more determined responses.

In one example, the method also includes determining, by the one or more computing devices, whether the identified stop sign has a shape and an angular orientation consistent with a stop sign in the detailed map information based on the vehicle's location and dimensions of the stop sign in the detailed map information corresponding to the location coordinates. In another example, determining whether the identified stop sign applies to the vehicle is also based on a height of the identified stop sign, a size of the identified stop sign, an orientation of the identified stop sign, a proximity of the identified stop sign near a person or pedestrian, a location with respect to a side of a road, a location with respect to a type of vehicle, and a location with respect to one or more traffic control features. In this example, the type of stop sign is one of a permanent stop sign, a semi-permanent stop sign, a handheld stop sign, and a school bus stop sign.

In yet another example, the method also includes, when the location coordinates correspond to a location of a stop sign in the detailed map information, determining whether the identified stop sign applies to the vehicle based on characteristics of the stop signed in the detailed map information. In a further example, if the identified stop sign is fixed at an intersection, determining the one or more responses of the vehicle also includes using laws, regulations, and general practices governing the intersection. In another example, if the identified stop sign is fixed next to a crosswalk, the one or more responses includes stopping until no pedestrians are detected within a predetermined distance of the crosswalk. In yet another example, if the identified stop sign is not fixed and is in the traffic lane, the one or more responses includes stopping until the identified stop sign is removed from the lane of travel.

Other aspects of the disclosure provide for a system. The system includes a memory storing detailed map information; and one or more computing devices configured to identify an object detected in a vehicle's environment having location coordinates as a stop sign; determine whether the location coordinates of the identified stop sign correspond to a location of a stop sign in the detailed map information; if the location coordinates do not correspond to a location of a stop sign in the detailed map information, determine whether the identified stop sign applies to the vehicle based on at least a location of the identified stop sign in relation to a traffic lane; if the identified stop sign applies to the vehicle, determine one or more responses of the vehicle based on at least one of the detailed map information, a determination of whether the identified stop sign is fixed, and the location of the identified stop sign with respect to one or more traffic control features; and control the vehicle based on the one or more determined responses.

In one example, the system also includes the vehicle, the vehicle being capable of autonomous navigation. In another example, the system also includes a detection system configured to detect one or more objects in the vehicle's environment and location coordinates of each object; and a vehicle control system configured to operate the vehicle; wherein identifying an object as a stop sign further comprises receiving object information from the detection system; and controlling the vehicle based on the one or more determined responses further comprises sending instructions based on the determined responses to the vehicle control system. In a further example, the one or more computing devices are also configured to determine whether the identified stop sign has a shape and an angular orientation consistent with a stop sign in the detailed map information based on the vehicle's location and dimensions of the stop sign in the detailed map information corresponding to the location coordinates.

In yet another example, determining whether the identified stop sign applies to the vehicle also includes determining a type of stop sign the identified stop sign is. In this example, the type of stop sign is one of a permanent stop sign, a semi-permanent stop sign, a handheld stop sign, and a school bus stop sign. In a further example, the one or more computing devices are also configured to, if the location coordinates do correspond to a location of a stop sign in the detailed map information, determine whether the identified stop sign applies to the vehicle based on characteristics of the stop sign in the detailed map information.

Further aspects of the disclosure provide for a non-transitory, tangible computer-readable storage medium on which computer readable instructions of a program are stored. The instructions, when executed by one or more computing devices, cause the one or more computing devices to perform a method. The method includes identifying an object detected in a vehicle's environment having location coordinates as a stop sign; determining whether the location coordinates of the identified stop sign correspond to a location of a stop sign in the detailed map information; if the location coordinates do not correspond to a location of a stop sign in the detailed map information, determining whether the identified stop sign applies to the vehicle based on at least a location of the identified stop sign in relation to a traffic lane; if the identified stop sign applies to the vehicle, determining one or more responses of the vehicle based on at least one of the detailed map information, a determination of whether the identified stop sign is fixed, and the location of the identified stop sign with respect to one or more traffic control features; and controlling the vehicle based on the one or more determined responses.

In one example, the method also includes determining whether the identified stop sign has a shape and an angular orientation consistent with a stop sign in the detailed map information based on the vehicle's location and dimensions of the stop sign in the detailed map information corresponding to the location coordinates. In another example, determining whether the identified stop sign applies to the vehicle also includes determining a type of stop sign the identified stop sign is. In this example, the type of stop sign is one of a permanent stop sign, a semi-permanent stop sign, a handheld stop sign, and a school bus stop sign. In yet another example, the method also includes, if the location coordinates do correspond to a location of a stop sign in the detailed map information, determining whether the identified stop sign applies to the vehicle based on characteristics of the stop sign in the detailed map information.

BRIEF DESCRIPTION OF THE DRAWINGS

FIG. 10 is an example flow diagram in accordance with aspects of the disclosure.

DETAILED DESCRIPTION

Overview

Figure 1:
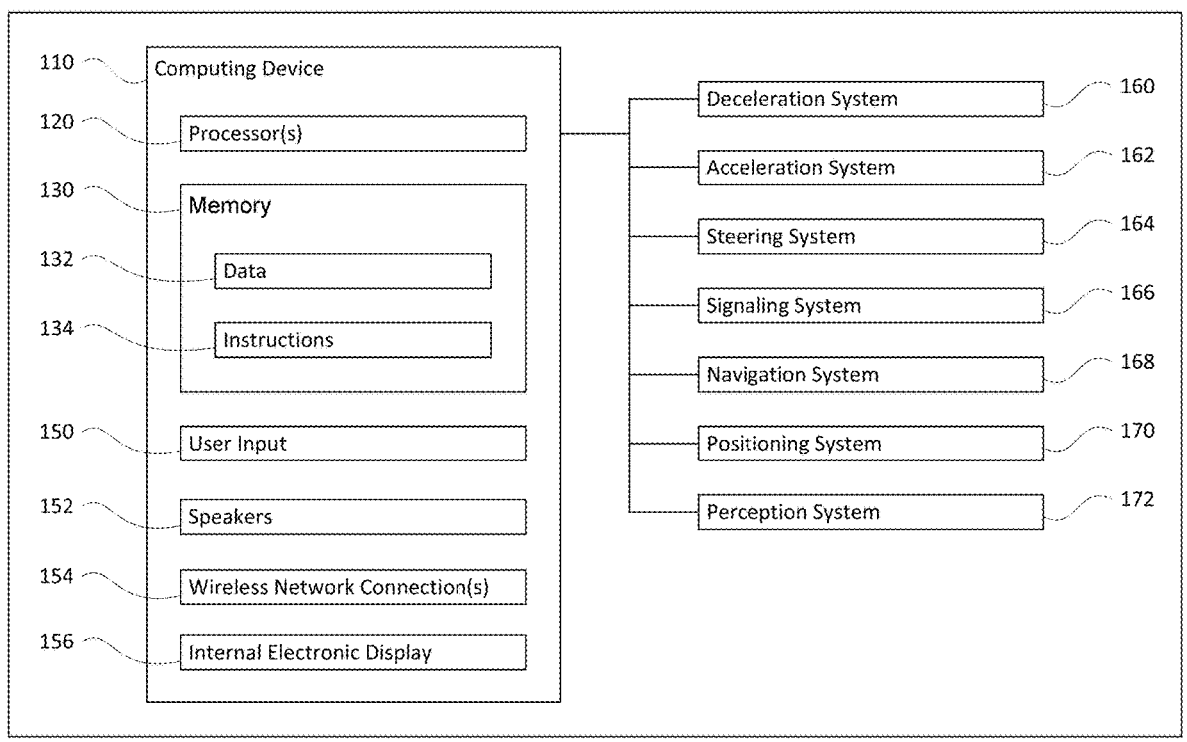
FIG. 1 is a functional diagram of a system in accordance with aspects of the disclosure.

The technology relates to determining a response of an autonomous vehicle to a stop sign. The autonomous vehicle may include a perception system. The system may include a plurality of sensors which provide sensor data to the vehicle's computing devices. This sensor data may describe the shape and geographic location coordinates of objects detected in the vehicle's environment. Map information including information that describes the location of stop signs may be pre-stored on one or more of the vehicle's computing devices.

When the perception system detects an object, the vehicle's computing devices may determine the location of the object and identify whether the object is a stop sign. To determine whether the object is a stop sign, various feature recognition techniques from images or sensor data (from radar or LIDAR, etc.) may be used. If the object is determined to be a stop sign, then the physical location of the identified stop sign may be compared with the detailed map information. In addition, the relative size and angle of the stop sign, may be compared with the detailed map information to determine whether or not the appearance of the stop sign is consistent with how the stop sign should appear based on the location of the vehicle and the location of the stop sign.

When the identified stop sign is determined to be consistent with a stop sign in the detailed map information, the vehicle's computing devices may use information about the stop sign in the detailed map information to determine whether the identified stop sign applies to the autonomous vehicle and/or how the vehicle should respond.

When the location of the identified stop sign does not correspond to a location of a stop sign in the detailed map information, the vehicle's computing devices may first determine whether the identified stop sign applies to the autonomous vehicle by using any number of factors such as the location of the identified stop sign with respect to lanes of travel; the proximity of the identified stop sign near a person or pedestrian; the height of the identified stop sign; the size of the identified stop sign; location with respect to road edges; location with respect to certain vehicle types, such as school buses; location with respect to other static objects, such as traffic cones or framing, etc.

When the identified stop sign is determined to apply autonomous vehicle, then the vehicle's computing devices may determine how the vehicle should respond. This determination may be based on whether the identified stop sign is fixed and where the identified stop sign is located. When an identified stop sign is fixed at or adjacent to an intersection, normal intersection semantics governed by traffic laws likely govern. When a stop sign is fixed next to a crosswalk, a vehicle may have to stop until no pedestrians are detected at or within some distance, such as a few feet or more or less, of the crosswalk. When a stop sign is not fixed and is in a lane of travel (such as in situations when a crossing guard or construction worker is holding up traffic), a vehicle may have to stop until the stop sign is removed from the lane of travel.

The features described herein may allow autonomous vehicles to react properly to different types of stop signs, even where those stop signs are "unexpected" when considered in reference to the vehicle's detailed map information. As a result, users of autonomous vehicles then do not have to switch into manual operation to respond to stop signs. These features also enable an autonomous vehicle's computing devices to distinguish between a stop sign at an intersection, stop sign at a crosswalk, and a handheld stop sign and to wait an appropriate amount of time at the stop sign based on its type. This, in turn may provide users of such autonomous vehicles a smoother ride experience without the need to pause autonomous operation in order to navigate past an unexpected stop sign.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor (s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone), various electronic displays (e.g., a monitor having a screen, a small LCD touch-screen or any other electrical device that is operable to display information), audio output (such as speakers 152), and a wireless network connection 154. In this example, the vehicle includes an internal electronic display 156. In this regard, internal electronic display 156 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle as needed in order to control the vehicle in fully autonomous (without input from a driver) as well as semi-automonus (some input from a driver) driving modes.

Figure 2:
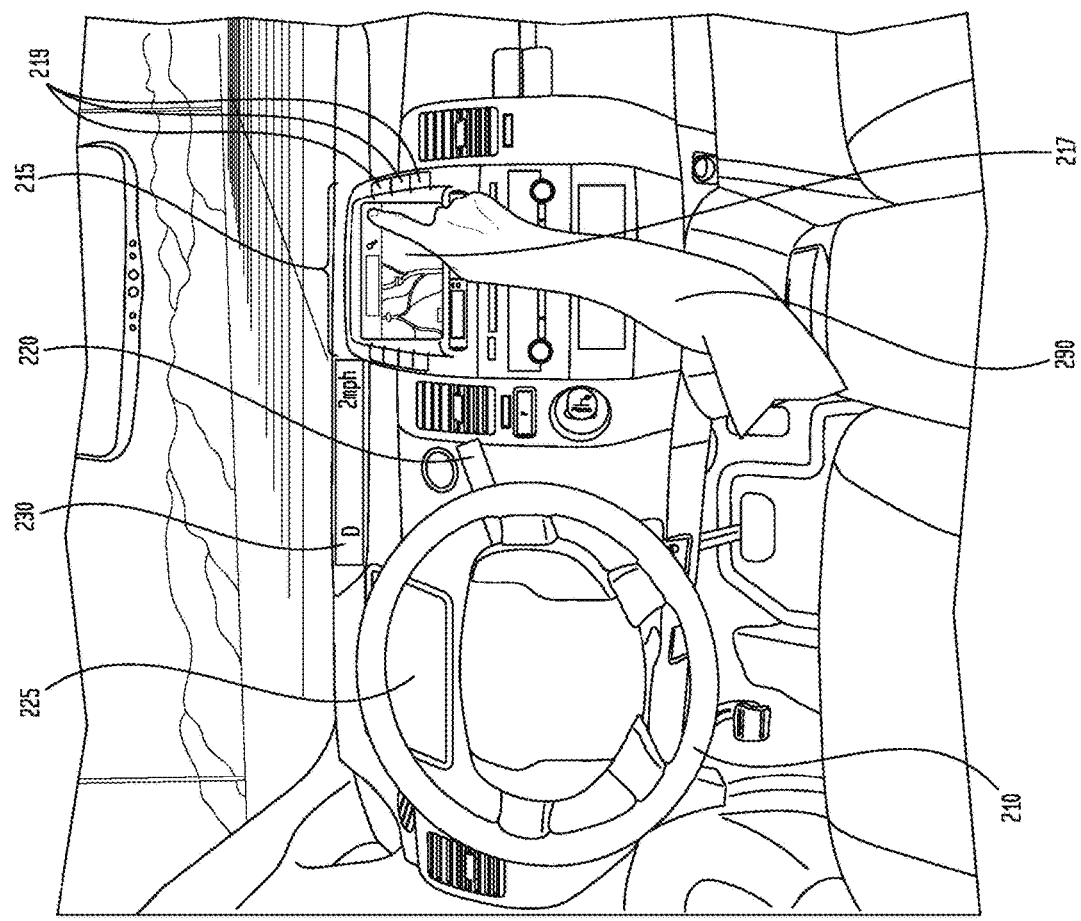
FIG. 2 is an interior of an autonomous vehicle in accordance with aspects of the disclosure.

As an example, FIG. 2 depicts an interior design of a vehicle having autonomous, semiautonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 156); and a gear selector apparatus, such as gear shifter 220. The vehicle may also have various user input devices 150 in addition to the foregoing, such as touch screen 217 (again, which may be a part of electronic display 156), or button inputs 219, for activating or deactivating one or more autonomous driving modes and for enabling a driver or passenger 290 to provide information, such as a navigation destination, to the computing device 110.

Returning to FIG. 1, when engaged, computer 110 may control some or all of these functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps identifying the shape and elevation of roadways, lane lines, intersections, crosswalks, speed limits, traffic signals, buildings, signs, real time traffic information, vegetation, or other such objects and information.

Figure 3:
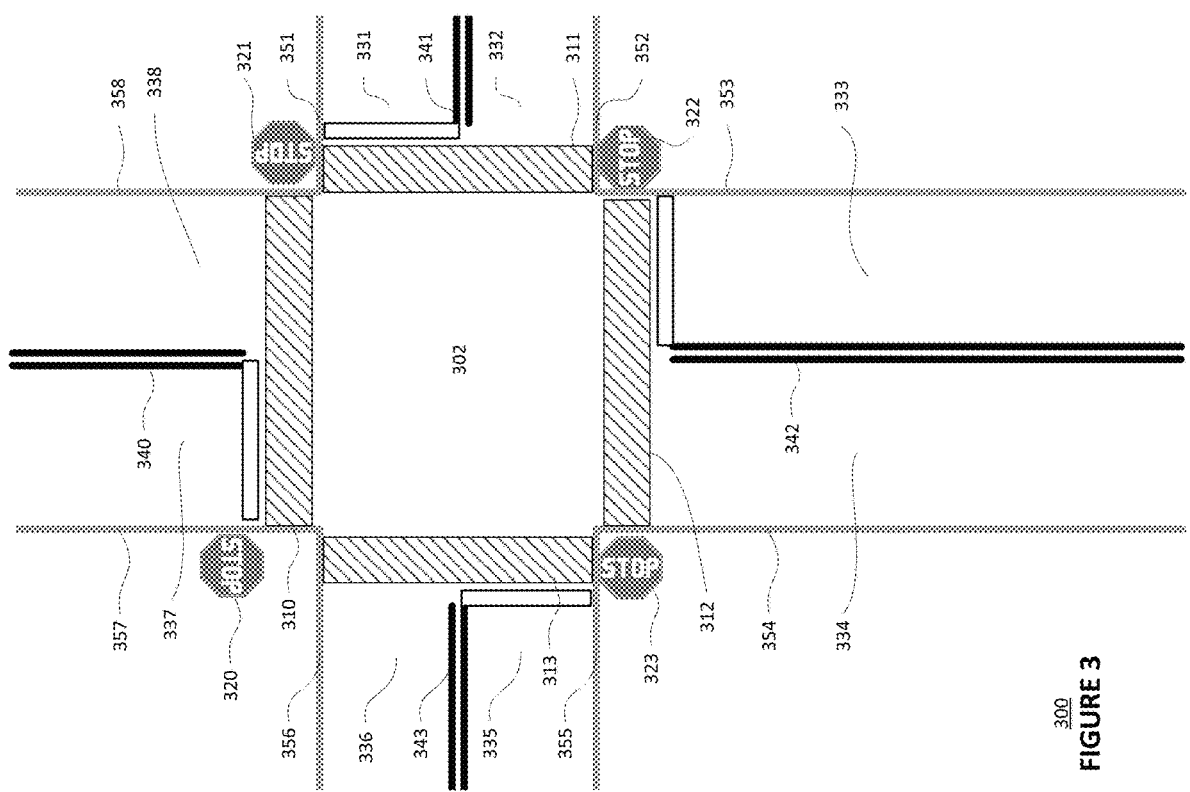
FIG. 3 is an example of detailed map information in accordance with aspects of the disclosure.

FIG. 3 is an example of detailed map information 300 for a section of roadway including an intersection 302. In this example, the detailed map information 300 includes information identifying the shape, location, and other characteristics of crosswalks 310, 311, 312, 313, stop signs 320, 321, 322, 323, lanes 331, 332, 333, 334, 335, 336, 337, 338, lane lines 340, 341, 342, and 343, and curbs 351, 352, 353, 354, 355, 356, 357, 358.

Positioning system 170 may be used by computing device 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting and performing analysis on objects external to the vehicle such as other vehicles, obstacles in the roadway, traffic signals, signs, trees, etc. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location as well as other sensors such as cameras, radars, sonars, and additional lasers. The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Various components of the perception system 172 may be positioned on or in the vehicle 100 in order to better detect external objects while the vehicle is being driven. In this regard, one or more sensors, such as laser range finders may be positioned or mounted on the vehicle. As an example, the one or more computing devices 110 may control laser range finder, e.g., by rotating it 180 degrees. In addition, the perception system may include one or more cameras mounted internally on the windshield of vehicle 100 to receive and analyze various images about the environment. In addition to the laser range finder is positioned on top of perception system 172, and the one or more cameras mounted internally on the windshield, other detection devices, such as sonar, radar, GPS, etc., may also be positioned in a similar manner.

The one or more computing devices 110 may also include features such as transmitters and receivers that allow the one or more devices to send and receive information to and from other devices. For example, the one or more computing devices may determine information about the position of a stop sign as well as information about when the stop sign applies to a vehicle. The one or more computing devices may send this information to other computing devices associated with other vehicles.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
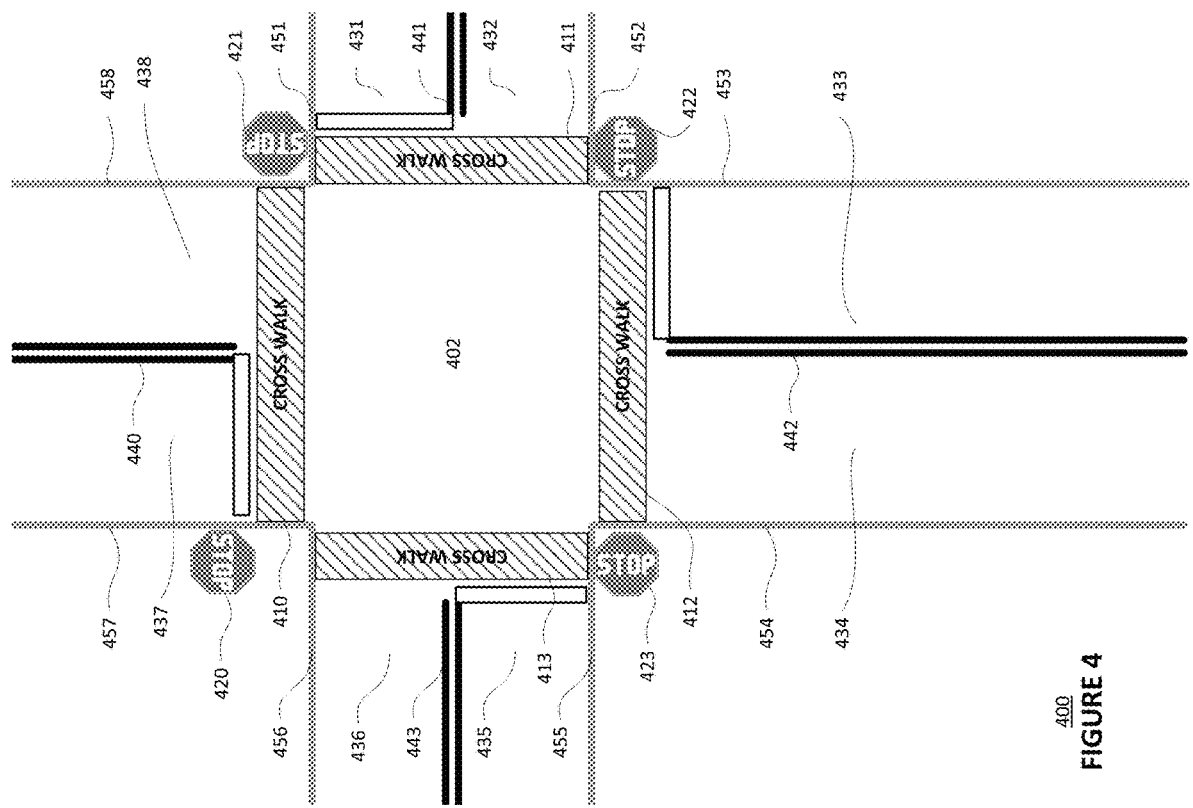
FIG. 4 is an example diagram of a section of roadway including an intersection in accordance with aspects of the disclosure.

As noted above, a vehicle's one or more computing devices may maneuver the vehicle using the various systems described above. For example, FIG. 4 depicts a section of roadway 400 including an intersection 402. In this example, vehicle 100 is approaching intersection 402 and may be controlled, for example by one or more computing device 110 in an autonomous driving mode as described above.

Intersection 402 corresponds to the intersection 302 of the detailed map information 300. In this regard, crosswalks 410, 411, 412, and 413 correspond to the shape, location and other characteristics of crosswalks 310, 311, 312, and 313, respectively. Similarly, stop signs 420, 421, 422, and 423 correspond to the characteristics of stop signs 320, 321, 322, and 323, respectively; lanes 431, 432, 433, 434, 435, 436, 437, and 438 corresponds to the characteristics of lanes 331, 332, 333, 334, 335, 336, 337, and 338, respectively; lane lines 440, 441, 442, and 443 correspond to the characteristics of lane lines 340, 341, 342, and 343, respectively; and curbs 451, 452, 453, 454, 455, 456, 457, and 458 correspond to the characteristics of curbs 351, 352, 353, 354, 355, 356, 357, and 358, respectively. In this regard, vehicle's position relative to intersection 502 may correspond to that of point A relative to the detailed map information 300.

Figure 5:
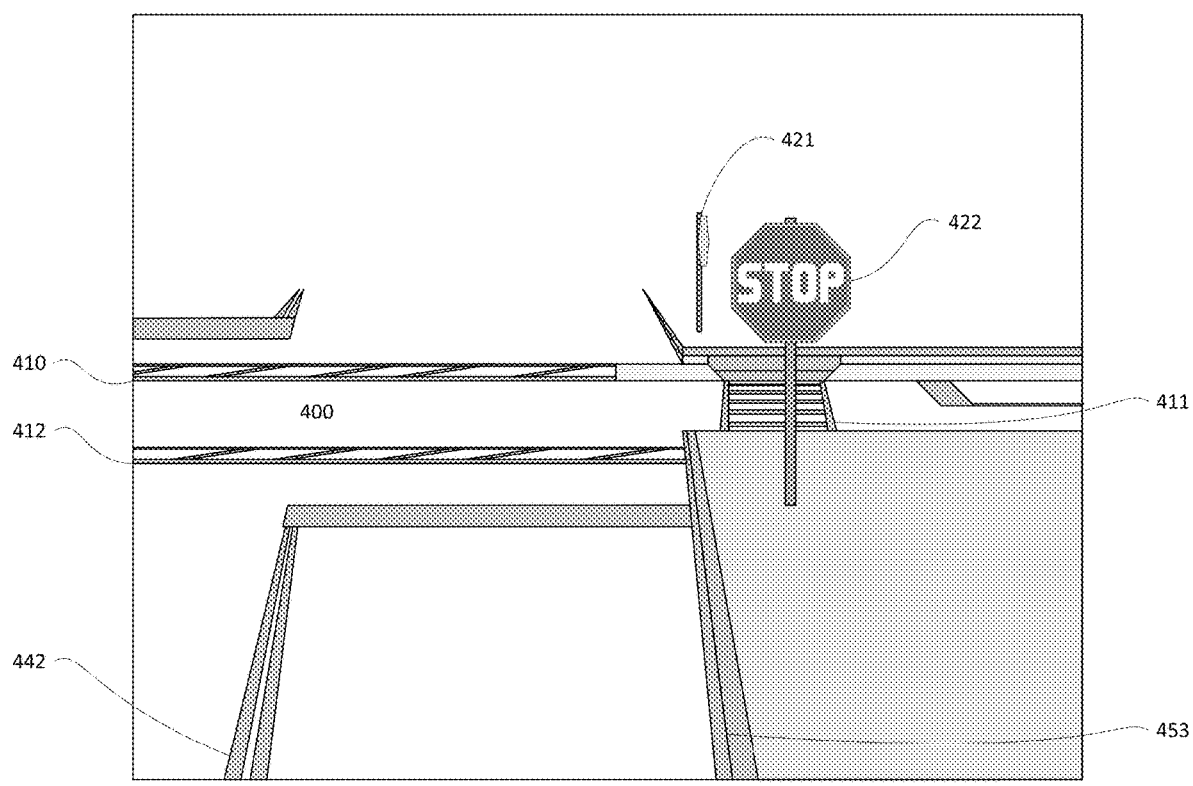
FIG. 5 is an example image of a vehicle's environment in accordance with aspects of the disclosure.
Figure 6:
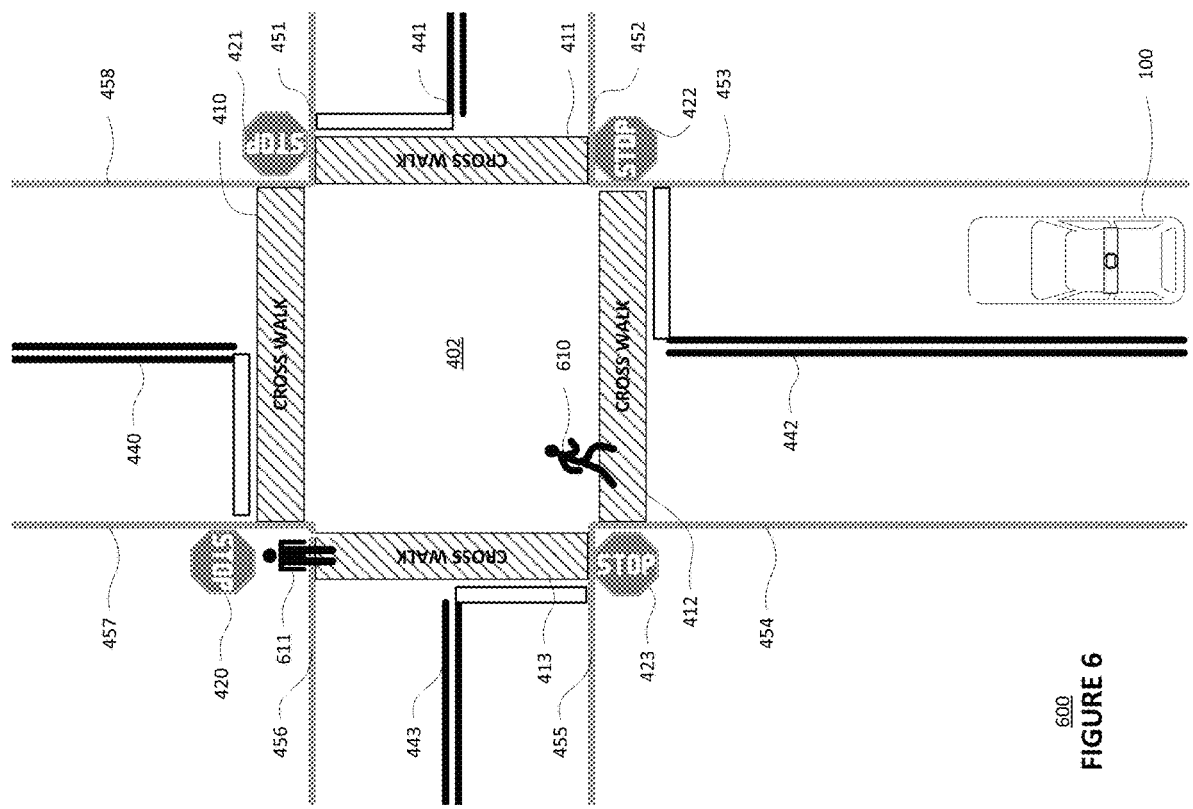
FIG. 6 is another example diagram of a section of roadway including an intersection in accordance with aspects of the disclosure.
Figure 7:
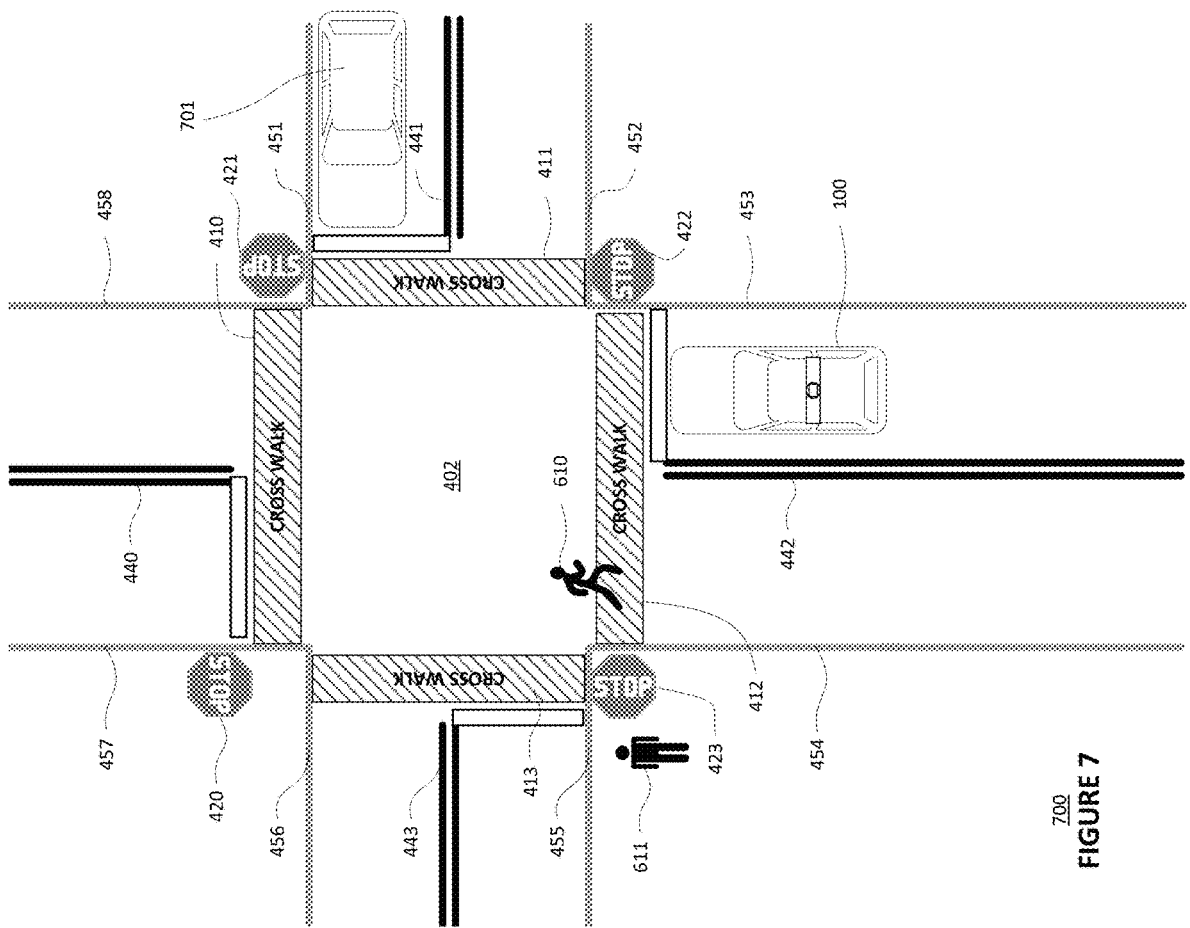
FIG. 7 is yet another example diagram of a section of roadway including an intersection in accordance with aspects of the disclosure.

As vehicle 100 is driven towards the intersection 402, the vehicle's perception system 172 receives and processes information from the various sensors discussed above. The perception system 172 may identify the shape, location, angle, and orientation of various objects in the vehicle's environment. For example, a camera mounted internally on the windshield of vehicle 100 may capture images of the vehicle's environment. FIG. 5 is an example of an image that may have been captured by a camera mounted on vehicle 100 from the location of vehicle 100 in FIG. 6. For example, FIG. 5 depicts a section of roadway 400 including an intersection 402 and various features such as crosswalks 410, 411, and 412, stop signs 421 and 422, lane lines 442, as well as curb 453 identified by the perception system 172 from sensor data (e.g., lasers, cameras, radar, sonar, etc.). Further, perception system 172 may also detect pedestrians and other vehicles in the vicinity of vehicle 100. For example, in FIG. 6, pedestrians 610 and 611 may be detected. In FIG. 7, vehicle 701 may additionally be detected.

When an object is detected by the perception system 172, the vehicle's computing devices 110 may determine the location of the object and identify whether the object is a stop sign. To determine whether the object is a stop sign, various feature recognition techniques from images or sensor data (from radar or LIDAR, etc.) may be used. The angular orientation and shape may then be determined to match that of a stop sign. If the object is determined to be a stop sign, then the physical location of the identified stop sign may be compared with the detailed map information as shown in FIG. 4. In addition, the appearance of the stop sign, such as the relative size and angle of the stop sign, as shown in the example image of FIG. 5, may be compared with the detailed map information to determine whether or not the appearance of the stop sign is consistent with how the stop sign should appear based on the location of the vehicle and the location of the stop sign.

The location of the identified stop sign may match the location of a stop sign in the detailed map information, and the appearance of the identified stop sign may be consistent with that of a stop sign at the location and viewed from the location of vehicle 100. For example, stop signs 421 and 422 detected by perception system 172 may be determined to be stop signs by the vehicle's computing devices 110 because the shapes and angular orientations of the stop signs 421 and 422 detected via various feature recognition techniques from images or sensor data (from radar or LIDAR, etc.) match that of a typical a stop sign. As an example, both stop signs have different angular orientations of an equilateral hexagon. Comparing the determined location of stop signs 421 and 422 and the location of stop signs in the detailed map information 300, stop signs 421 and 422 may be identified as stop signs 321 and 322, respectively. Based on information in the detailed map information 300 regarding angular orientation and appearance of stop signs 321 and 322, the vehicle's computing device 110 may determine that the angular orientation and appearance of stop signs 421 and 422 in the image in FIG. 5 match that of stop signs 321 and 322 viewed from the location of the vehicle 100.

If the location and the relative size and angle do match that of a stop sign in the detailed map information, the vehicle's computing devices 110 may determine that the stop sign is a permanent stop sign and may then determine whether the identified stop sign applies to the autonomous vehicle and/or how the vehicle should respond based on the information about the stop sign retrieved from detailed map information. For example, based on the location and angular orientation of stop sign 421 and 422, vehicle's computing devices 110 may determine that stop sign 421 does not apply to the vehicle 100 and that stop sign 422 does apply to vehicle 100. Therefore the vehicle 100 may stop before crosswalk 412 in accordance with the traffic pattern of intersection 402 and stop sign 422. Additionally, when the vehicle 100 approaches a location of a stop sign indicated in the detailed map information, the vehicle's computing devices 110 may determine the applicability of the stop sign and the response of the vehicle 100 even if a stop sign has not been detected at the location by the perception system 172.

In the case in which the location of the identified stop sign does not match the location of a stop sign in the detailed map information, the vehicle's computing devices 110 may determine whether the identified stop sign applies to vehicle 100 by using a number of factors. Factors may include location of the identified stop sign with respect to lanes of travel; the proximity of the identified stop sign near a person or pedestrian; the height of the identified stop sign; the size of the identified stop sign; the orientation of the identified stop sign; location with respect to road edges; location with respect to certain vehicle types, such as school buses; location with respect to traffic control features, such as traffic lights, signs, crosswalks, traffic cones, lane lines, or other object or demarcation related to traffic. For example, the height of the identified stop sign may be used to differentiate between a handheld sign that is held up to signal the need to stop and a handheld sign that is not signaling the need to stop. The orientation of the identified stop sign (right-side up, upside down, or somewhere degree in between) may be used to differentiate between a handheld sign that is held up to signal the need to stop and one that is not. For example, an upside down stop sign is most likely a handheld stop sign that is not being held up, and therefore not signaling the need to stop. The dimensions of the identified stop sign may be used to differentiate between a small handheld stop sign and a larger stop sign that is typically mounted on a post.

Any number of these and other factors may be considered in determining whether the identified stop sign applies to vehicle 100. A type of stop sign may be identified as part of the determination of the applicability of the stop sign to vehicle 100. Stop signs may be permanent, semi-permanent, or temporary. Permanent stop signs may be fixed and freestanding at a location and may govern general traffic patterns. Semi-permanent stop signs may be removable and freestanding and may be used to change traffic patterns for an extended period of time (e.g., detours due to construction). Temporary stop signs may be removable and may be used to temporarily stop traffic in certain situations such as crossing guards stopping traffic to allow pedestrians to cross and school buses stopped at a bus stop.

Figure 9:
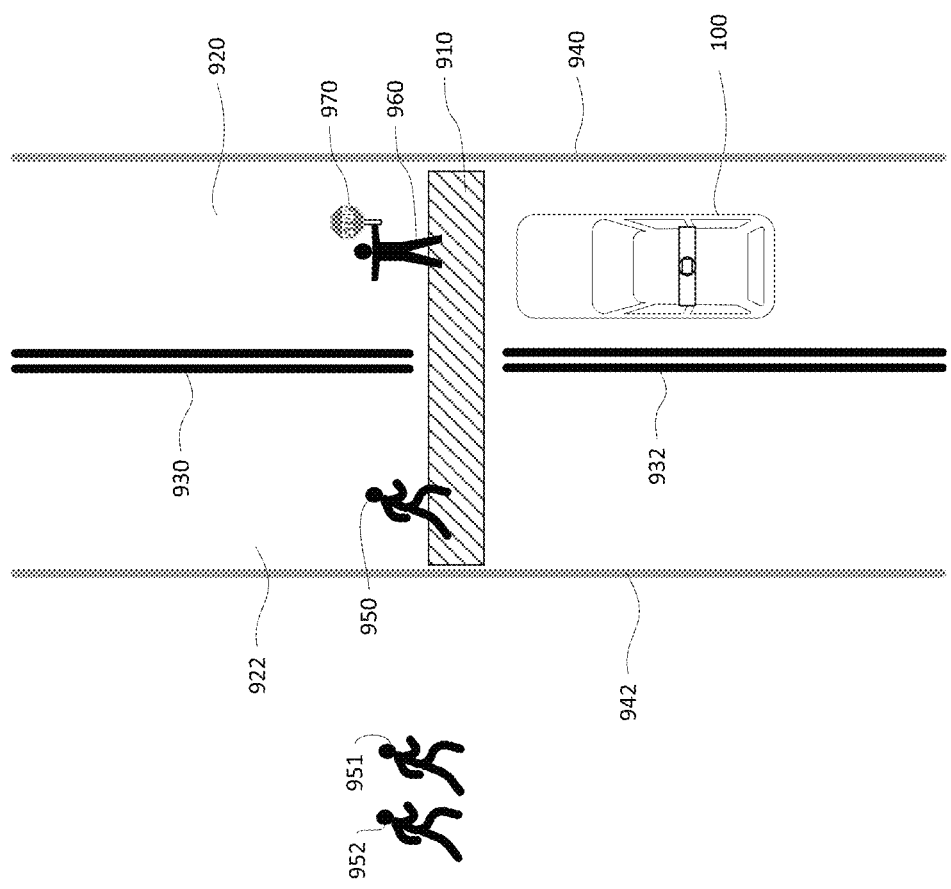
FIG. 9 is an example diagram of a section of roadway including a crosswalk in accordance with aspects of the disclosure.

For example, stop sign 422 may be detected to be within a few meters of the lane of travel of the vehicle 100, up higher than a threshold height, and bigger than a threshold size. Based on these factors, vehicle's computing devices 110 may be determined that stop sign 422 is a permanent stop sign at an intersection and may likely be applicable to the vehicle. The threshold numbers (height, size, etc.) are related to general visibility and expectations of human drivers. As a further example, a human driver is unlikely to notice a stop sign that is not held up high, is smaller, and is several meters away from the road. Even if the human driver does notice the stop sign, he or she would likely not stop for it. On the other hand, a sign held up high just inside the road edge is something that a human driver would observe and stop for. Turning to FIG. 9, stop sign 970 may be detected in the lane of travel 920 of the vehicle 100, near a person 960, above a threshold height, and smaller than a threshold size. In this case, it may be determined that stop sign 970 applies to vehicle 100 because it may be a crossing guard or construction worker holding up a handheld stop sign.

Figure 8:
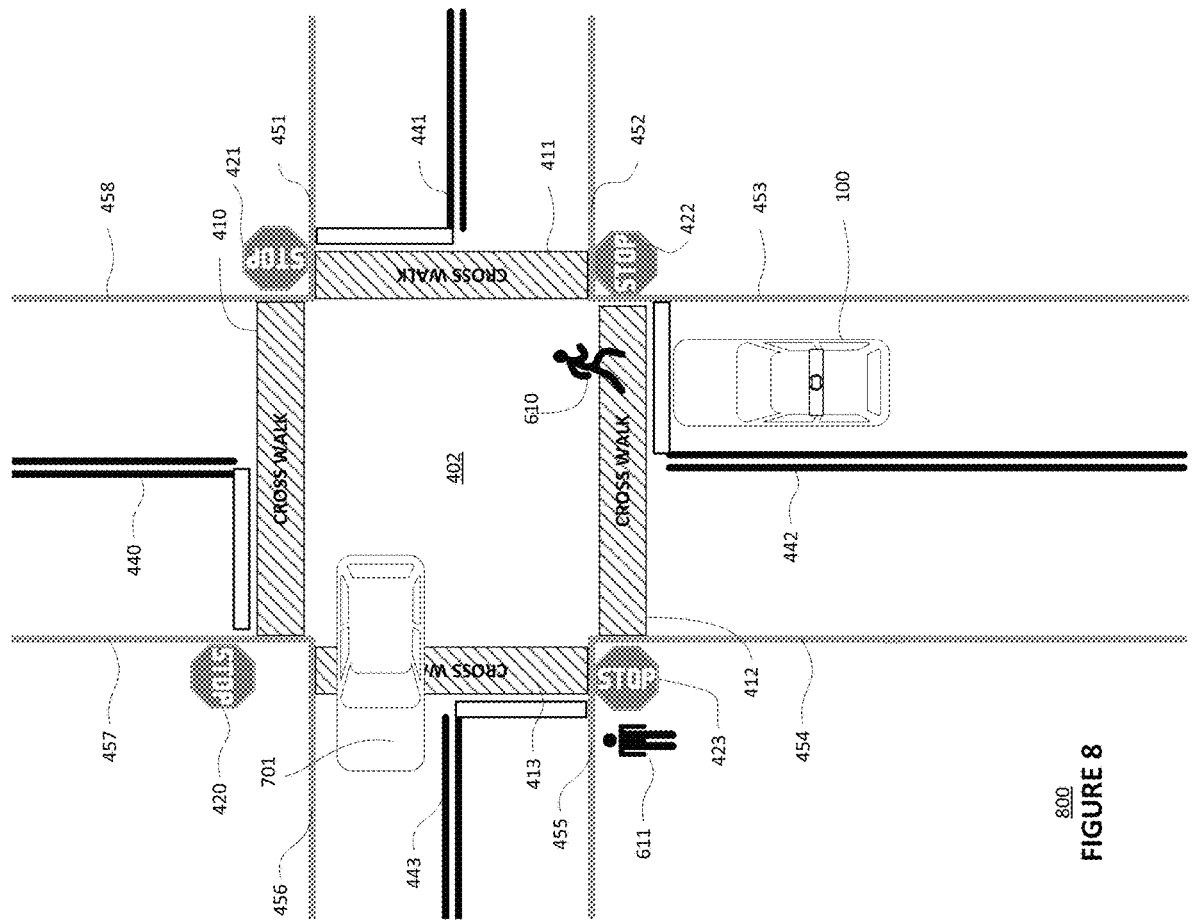
FIG. 8 is a further example diagram of a section of roadway including an intersection in accordance with aspects of the disclosure.

When the identified stop sign is determined to apply to vehicle 100, in other words, that vehicle 100 is required to stop before the identified stop sign, then the vehicle's computing devices 110 may determine how the vehicle 100 should respond. In other words, the vehicle's computing devices 110 may determine whether the vehicle should stop, where the vehicle should stop, for how long the vehicle should stop, and/or when the vehicle can resume driving, among other things. This determination may be based on whether the identified stop sign is fixed and where the identified stop sign is located. When a stop sign is fixed at an intersection, the vehicle 100 may be operated according to the laws, regulations, and general practices governing the intersection, as shown in FIGS. 6-8. In addition, when a stop sign is fixed next to a crosswalk, also shown in FIGS. 6-8, a vehicle may have to stop until no pedestrians are detected. As previously described, the vehicle's computing device 110 may be determined that stop sign 422 is located near intersection 402 and apply to vehicle 100. Therefore, vehicle 100 is required to stop at stop sign 422 before crosswalk 412. Using the detailed map information, the vehicle's computing devices 110 may further determine that the intersection is a four-way stop and are governed by the laws, regulations, and general practices governing four-way stops. In addition, having identified a crosswalk 412 by stop sign 422, the computing devices 110 may determine that the semantics regarding crosswalks also governs.

As a result, as vehicle 100 comes to a stop before stop sign 422, as shown in FIG. 7, vehicle 701 may be detected stopped before stop sign 421. Based on the laws, regulations, and general practices for four-way stops, the vehicle's computing device 110 may determine that vehicle 100 should also remain stopped until vehicle 701 passes through the intersection. At the same time, pedestrian 610 may be detected in crosswalk 412. Based on the laws, regulations, and general practices governing crosswalk, it may be determined that vehicle 100 should remain stopped until pedestrian 610 is no longer in the crosswalk. Therefore, as shown in FIG. 7, even after vehicle 701 has passed through intersection 402, pedestrian 610 may still be detected in crosswalk 412. Vehicle 100 may therefore remain stopped at stop sign 422 until pedestrian 610 vacates the crosswalk.

Also, when a stop sign is not fixed and is in a lane of travel (such as in situations when a crossing guard or construction worker is holding up traffic), a vehicle may have to stop until the stop sign is removed from the lane of travel in order to ensure the safety of any pedestrians in the area, as shown in FIG. 9. As vehicle 100 approaches crosswalk 910, perception system 172 may detect crosswalk 910, lanes 920 and 922, lane lines 930 and 932, curbs 940 and 942, pedestrians 950, 951, 952, crossing guard 960, and stop sign 970. As previously described with regard to stop sign 970, the vehicle's computing devices 110 may determine that stop sign 970 applies to vehicle 100. In addition, vehicle's computing device 110 may also determine that laws, regulations, and general practices relating to crossing guards govern the operation of vehicle 100 in this scenario based on the determination that stop sign 970 is being held up by a crossing guard 960 currently standing in crosswalk 910 where crosswalk 910 intersects with lane 920. Therefore, vehicle 100 may remain stopped before crosswalk 910 while pedestrians 950, 951, and 952 cross, but also remain stopped until crossing guard 960 lowers stop sign 970, flips stop sign 970 around, and/or and vacates crosswalk 910 as well. Then vehicle 100 may resume traveling down lane 920. Vehicle's computing devices 110 may also determine that vehicle 100 should stop at crosswalk 910 even when crossing guard 960 with raised stop sign 970 is a few meters outside the crosswalk. In addition, if vehicle 100 were approaching crosswalk 910 from the opposite direction in lane 922 and the vehicle's computing devices 110 determines that laws, regulations, and general practices relating to crossing guards govern the operation of vehicle 100, vehicle 100 may also remain stopped before crosswalk 910 until crossing guard 960, currently standing in lane 920, lowers stop sign 970 and vacates crosswalk 910.

In yet another example, a stop sign may be detected extending from a school bus. In addition to the considerations already discussed above, whether the stop sign applies to vehicle 100 may also be based on the location of the school bus in relation to vehicle 100 and whether a pattern of lights is detected on the school bus. The vehicle's computing devices 110 may determine that the laws, regulations, and general practices relating to school buses govern vehicle 100. Then, the vehicle's computing devices 110 may determine that vehicle is required to remain stopped until the stop sign is retracted at a location based on at least the size and position of the school bus.

Determining a vehicle's response to an applicable stop sign may also take into account a level of uncertainty regarding the position of the identified stop sign. For instance, if a stop sign is detected by perception system 172 at far range with a few meters of positional uncertainty, and therefore could be anywhere from in the road to far off the road, the vehicle's response may initially be more conservative. The response may then be changed as positional uncertainty decreases when vehicle 100 travels closer to the stop sign. For example, vehicle's computing devices 100 may determine initially to apply the brakes of vehicle 100 to decelerate vehicle 100 at a slower rate. Then, as positional uncertainty decreases, vehicle's computing devices 110 may determine to apply the brakes to decelerate vehicle 100 at a faster rate in order for vehicle 100 to stop at the required position in response to the location of the detected stop sign.

FIG. 10 is an example flow diagram 1000 which depicts some of the aspects described above which may be performed by one or more computing devices such as one or more computing devices 110 of vehicle 100. In this example, an object detected in a vehicle's environment having location coordinates may be identified as a stop sign at block 1010. At block 1020, it may be determined whether the identified stop sign is consistent in appearance with a stop sign in detailed map information. The determination of consistency may be based on matching the location and the angular orientation of the identified stop sign with that of a stop sign in the detailed map information.

If the appearance is consistent with the appearance of a stop sign in the detailed map information, then whether the identified stop sign applies to the vehicle may be determined based on the detailed map information associated with the stop sign in the detailed map information at block 1030A.

However, if the appearances do not match, whether the identified stop sign applies to the vehicle may be determined based on a number of factors at block 1030B. For example, factors may include a location of the identified stop sign in relation to lanes of travel, a height of the identified stop sign, a size of the identified stop sign, a proximity of the identified stop sign near a person or pedestrian, a location with respect to a side of a road, a location with respect to a type of vehicle, a location with respect to one or more traffic control features, etc.

If the identified stop sign does apply to the vehicle, one or more responses of the vehicle to the stop sign may be determined at block 1040. The determination may be based on at least one of the detailed map information, a determination of whether the identified stop sign is fixed, and a location of the identified stop sign in relation to one or more traffic control features. At block 1050, the vehicle may be controlled based on the one or more determined responses.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system comprising:
   a detection system configured to detect one or more objects in a vehicle's environment; and
   one or more computing devices configured to:
   detect, using the detection system, a stop sign in an environment of the vehicle;
   determine that the detected stop sign applies to the vehicle based on a detected height of the detected stop sign and a detected size of the detected stop sign;
   when the detected stop sign is determined to apply to the vehicle, determine one or more responses of the vehicle based on a set of vehicle behavioral rules relating to a location of the detected stop sign; and
   control the vehicle based on the determined one or more responses.

2. The system of claim 1, wherein the detected stop sign is also determined to apply to the vehicle based on a detected a distance of the detected stop sign from an edge of a road.

3. The system of claim 1, wherein the detected stop sign is also determined to apply to the vehicle by determining the detected stop sign is next to a crosswalk, and the one or more responses of the vehicle are determined further based on a second set of vehicle behavioral rules relating to crosswalks.

4. The system of claim 3, wherein the one or more responses includes stopping until no pedestrians are detected within a predetermined distance of the crosswalk.

5. The system of claim 1, wherein the set of vehicle behavioral rules includes laws, regulations, and general practices governing the location of the detected stop sign.

6. The system of claim 1, wherein the detected stop sign is also determined to apply to the vehicle by determining the detected stop sign is near an intersection, and the one or more responses of the vehicle are determined further based on a second set of vehicle behavioral rules relating to intersections.

7. The system of claim 6, wherein the second set of vehicle behavioral rules includes laws, regulations, and general practices governing intersections.

8. The system of claim 1, wherein determining the one or more responses of the vehicle includes:
   determining a level of uncertainty regarding the location of the detected stop sign; and
   determining the one or more responses to include slowing the vehicle at a given rate, where the given rate is faster when the level of uncertainty is lower and slower when the level of uncertainty is higher.

9. The system of claim 1, further comprising the vehicle.

10. A system comprising:
    a detection system configured to detect one or more objects in a vehicle's environment; and
    one or more computing devices configured to:
    detect, using the detection system, a stop sign in an environment of the vehicle;
    determine that the detected stop sign is a handheld stop sign that applies to the vehicle based on a detected height of the detected stop sign, a detected size of the detected stop sign, a detected location of the detected stop sign relative to a road, and a detected location of the detected stop sign relative to a person;
    when the detected stop sign is determined to be a handheld stop sign that apply to the vehicle, determine one or more responses of the vehicle based on a set of vehicle behavioral rules relating to handheld stop signs; and
    control the vehicle based on the determined one or more responses.

11. The system of claim 10, wherein the detected stop sign is also determined to be a handheld stop sign that applies to the vehicle by determining an orientation of the detected stop sign; and
    wherein the detected stop sign is determined to be a handheld stop sign that applies to the vehicle when determined to be upright or almost upright, and the detected stop sign is determined to be a handheld stop sign that does not apply to the vehicle when determined to be upside down or almost upside down.

12. The system of claim 10, wherein the set of vehicle behavioral rules includes laws, regulations, and general practices governing handheld stop signs.

13. The system of claim 10, wherein the one or more responses includes stopping until the handheld stop sign is not in the road and is more than a threshold distance from an edge of the road.

14. The system of claim 10, wherein the one or more computing devices are further configured to:
    determine that the detected stop sign is next to or in a crosswalk; and
    wherein the one or more responses of the vehicle are determined further based on a second set of vehicle behavioral rules relating to crosswalks.

15. The system of claim 14, wherein the one or more responses includes stopping until no pedestrians are detected within a predetermined distance of the crosswalk.

16. The system of claim 10, further comprising the vehicle.

17. A system comprising:
    a detection system configured to detect one or more objects in a vehicle's environment; and
    one or more computing devices configured to:
    detect, using the detection system, a stop sign in an environment of a vehicle;
    detect a school bus in the environment of the vehicle;
    determine that the detected stop sign is a school bus stop sign that applies to the vehicle based on a detected orientation of the detected stop sign relative to the detected school bus and a location of the detected school bus relative to the vehicle;

when the detected stop sign is determined to apply to the vehicle, determine one or more responses of the vehicle based on a set of vehicle behavioral rules relating to school buses; and control the vehicle based on the determined one or more responses.

18. The system of claim 17, wherein the detected stop sign is also determined to be a school bus stop sign that applies to the vehicle by determining the detected school bus is emitting a pattern of lights.

19. The system of claim 17, wherein the set of vehicle behavioral rules includes laws, regulations, and general practices governing school buses.

20. The system of claim 17, further comprising the vehicle.

\* \* \* \* \*